US008482761B2

(12) United States Patent  (10) Patent No.: US 8,482,761 B2
Ohmiya  (45) Date of Patent: Jul. 9, 2013

(54) MANAGEMENT OF PRINT PROCESSES FOR A PRINTER

(75) Inventor: Takashi Ohmiya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1412 days.

(21) Appl. No.: 12/163,501

(22) Filed: Jun. 27, 2008

(65) Prior Publication Data

US 2009/0002758 A1  Jan. 1, 2009

(30) Foreign Application Priority Data

Jun. 29, 2007 (JP) ................................. 2007-171747

(51) Int. Cl.
*G06F 3/12* (2006.01)
(52) U.S. Cl.
USPC ........................................................ 358/1.15
(58) Field of Classification Search
None
See application file for complete search history.

(56) References Cited

U.S. PATENT DOCUMENTS

| 7,307,744 | B2 | 12/2007 | Hikawa | |
|---|---|---|---|---|
| 2002/0171864 | A1* | 11/2002 | Sesek | 358/1.15 |
| 2002/0191205 | A1* | 12/2002 | Stringham | 358/1.13 |
| 2003/0076525 | A1 | 4/2003 | Hikawa | |

FOREIGN PATENT DOCUMENTS

| JP | 10-000836 A | 1/1998 |
|---|---|---|
| JP | 10-098599 | 4/1998 |
| JP | 11-203068 A | 7/1999 |
| JP | 11-249828 | 9/1999 |
| JP | 2000089613 A | 3/2000 |
| JP | 2000-151895 A | 5/2000 |
| JP | 2000-335054 A | 12/2000 |
| JP | 2002-114429 | 4/2002 |
| JP | 2002-200821 A | 7/2002 |
| JP | 2003-131831 A | 5/2003 |
| JP | 2006092165 A | 4/2006 |

OTHER PUBLICATIONS

JP Notification of Reasons for Rejection dated Aug. 9, 2011, corresponding to JP Application No. 2007-171747.
Notification of Reasons for Rejection for Japanese patent application No. 2007-171747 mailed Nov. 8, 2011.

* cited by examiner

*Primary Examiner* — Jeremiah Bryar
(74) *Attorney, Agent, or Firm* — Banner & Witcoff, Ltd.

(57) ABSTRACT

A printer may be provided with a receiving device, a housing portion, a print device, a detecting device, a determination device, and a controller. The receiving device receives a print job including print data and type information specifying the type of print medium. The housing portion houses a print medium that has not been printed. The print device executes a print process that prints an image corresponding to the print data included in the print job on the type of print medium specified by the type information. The detecting device detects whether the housing portion is housing the type of print medium specified by the type information included in the print job. The determination device determines whether the print process based on the print job has been started. The controller controls the print device based on information detected by the detecting device and information determined by the determination device.

9 Claims, 10 Drawing Sheets

MANAGEMENT OF PRINT PROCESSES FOR A PRINTER

CROSS-REFERENCE TO RELATED APPLICATION

This application claims priority to Japanese Patent Application No. 2007-171747, filed on Jun. 29, 2007, the contents of which are hereby incorporated by reference into the present application.

BACKGROUND OF THE INVENTION

1. Field of the Invention

The present invention relates to a printer that receives a print job, and prints an image corresponding to print data included in the print job onto a print medium.

2. Description of the Related Art

A printer receives a print job. The print job includes print data and type information specifying a type of print medium. The printer executes a print process to print an image corresponding to the print data onto a print medium specified by the type information. For example, it may be the case that the size of the print medium specified by the type information of the print job does not conform with the size of the print medium housed in the printer (below, this is termed a first error). Further, for example, the print medium housed in the printer may run out while the print process of the print job is being executed (below, this is termed a second error). When the first error or the second error occurs in a conventional printer, error is displayed and the print job is put in a hold state (the print process is interrupted). The conventional printer is disclosed for example in Japanese Patent Application Publication No. 11-249828.

BRIEF SUMMARY OF THE INVENTION

In the present specification, a printer having a new configuration is taught. The printer taught in the present specification may comprise a receiving device, a housing portion, a print device, a detecting device, a determination device, and a controller. The receiving device may receive a print job including print data and type information specifying the type of print medium. The housing portion may house a print medium that has not been printed. The print device may execute a print process that prints an image corresponding to the print data included in the print job received by the receiving device on the type of print medium specified by the type information included in the print job. The detecting device may detect whether the housing portion is housing the type of print medium specified by the type information included in the print job received by the receiving device. The determination device may determine whether the print process based on the print job received by the receiving device has been started. The controller may control the print device based on information detected by the detecting device and information determined by the determination device.

DETAILED DESCRIPTION OF THE PREFERRED EMBODIMENT (First Embodiment)
(Configuration of the Printer)

Figure 1:
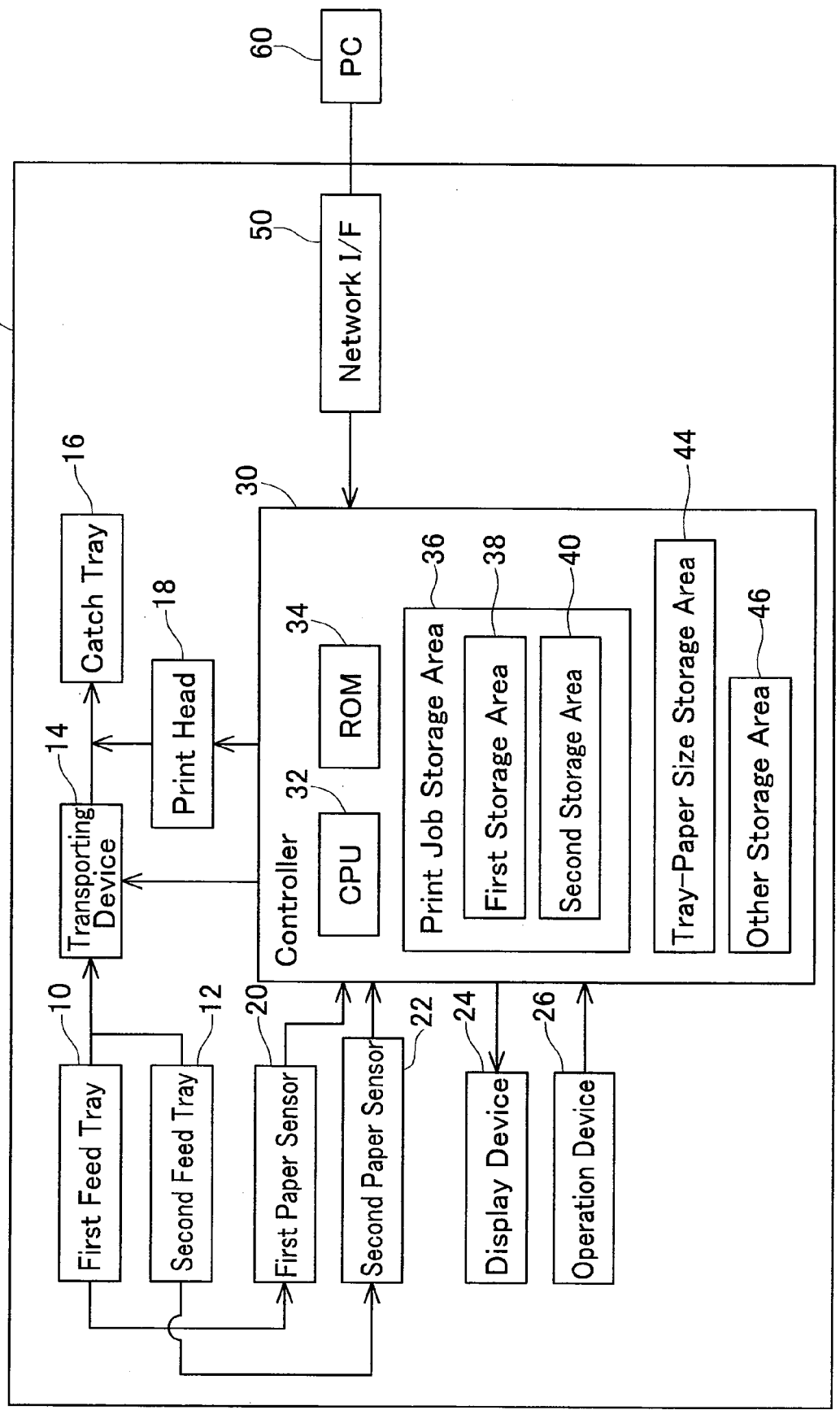
FIG. 1 shows the configuration of a printer of a first embodiment.

A printer of a first embodiment will be described. FIG. 1 shows the configuration of a printer 2 of the present embodiment. The printer 2 comprises a plurality of feed trays 10 and 12, a transporting device 14, a catch tray 16, a print head 18, a first paper sensor 20, a second paper sensor 22, a display device 24, an operation device 26, a controller 30, a network interface 50, etc. The first feed tray 10 is capable of housing, for example, A4 size printing paper. The second feed tray 12 is capable of housing printing paper of a type (for example, A3 size) differing front that of the first feed tray 10. The transporting device 14 is capable of transporting the printing paper housed in the first feed tray 10 to the catch tray 16. Further, the transporting device 14 is also capable of transporting the printing paper housed in the second feed tray 12 to the catch tray 16. The catch tray 16 supports the printing paper transported by the transporting device 14. The first paper sensor 20 detects whether printing paper is being housed in the first feed tray 10. The detected results of the first paper sensor 20 are sent to the controller 30. The second paper sensor 22 detects whether printing paper is being housed in the second feed tray 12. The detected results of the second paper sensor 22 are sent to the controller 30. The display device 24 is capable of displaying information. A user can input instructions to the printer 2 by operating the operation device 26.

The controller 30 controls the transporting device 14, the print head 18, and the display device 24. The controller 30 has a CPU 32, a ROM 34, a print job storage area 36, a tray-paper size storage area 44, and another storage area 46. The CPU 32 executes processes in accordance with programs stored in the ROM 34. For example, the CPU 32 executes processes to drive the transporting device 14 and the print head 18, and processes to cause a display on the display device 24, etc. The ROM 34 stores programs to be executed by the CPU 32. The contents of the processes executed by the CPU 32 will be described in detail later.

Figure 2:
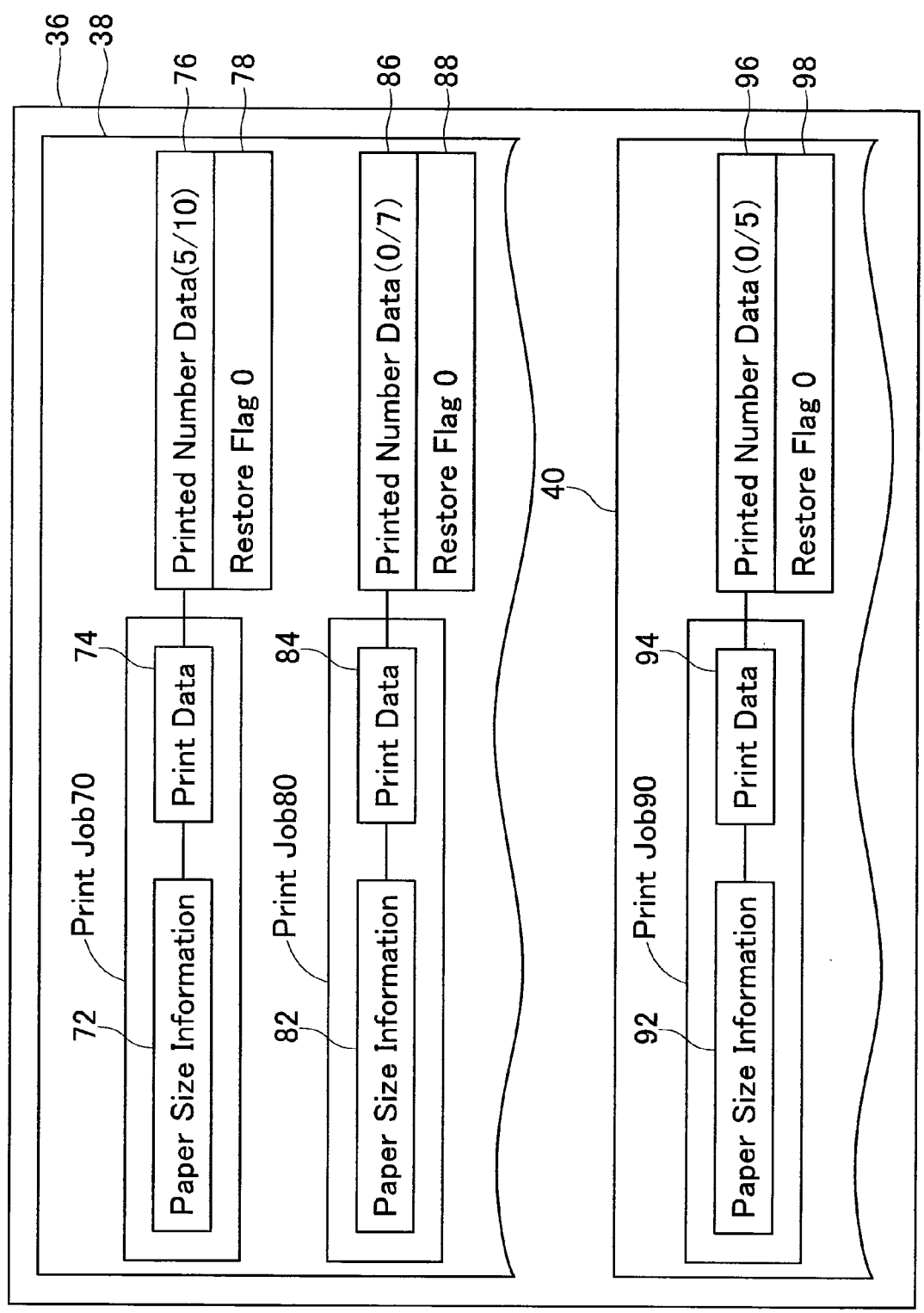
FIG. 2 shows a figure for explaining a print job storage area.

FIG. 2 shows an example of stored contents of the print job storage area 36. The print job storage area 36 has a first storage area 38 and a second storage area 40. The first storage area 38 is capable of storing a plurality of print jobs 70 and 80. The print job 70 includes paper size information 72 and print data 74. The paper size information 72 is information relating to the size of printing paper on which the print data 74 is to be printed. The print data 74 is data relating to an image such as text, a picture, etc. Printed number data 76 and a restore flag 78 are associated with the print job 70. The printed number data 76 is data showing which page of printing has been completed out of the total pages of print data 74 to be printed. The printed number data 76 is showing that printing of the fifth page out of ten pages has been completed. The restore flag 78 is normally "0", and becomes "1" in the case where a print job has been moved from the second storage area 40 to the first storage area 38. Like the print job 70, the print job 80 includes paper size information 82 and print data 84. Printed number data 86 and a restore flag 83 are associated with the print job 80.

A print job may be moved from the first storage area 38 to the second storage area 40. The condition under which this movement occurs will be described in detail later. The second storage area 40 is capable of storing a plurality of print jobs 90 (only one print job 90 is shown in the example in FIG. 2). The print job 90 includes paper size information 92 and print data 94. Printed number data 96 and a restore flag 98 are associated with the print job 90. The restore flag 98 is "0". When the print job 90 is moved to the first storage area 38, the restore flag 98 becomes "1". This point will be described in detail later.

The tray-paper size storage area 44 of FIG. 1 stores, for each feed tray 10, 12, an association of the feed tray and the size of printing paper to be housed therein. For example, the tray-paper size storage area 44 stores an association of A4 size and the first feed tray 10. Further, for example, the tray-paper size storage area 44 stores an association of A3 size and the second feed tray 12. The storage area 46 is capable of storing data created while the CPU 32 is executing processes. The network interface 50 is connected with a PC 60. The network interface 50 is capable of receiving a print job sent from the PC 60. The print job received by the network interface 50 is taken to the controller 30.

(Process Executed by the CPU)

Figure 3:
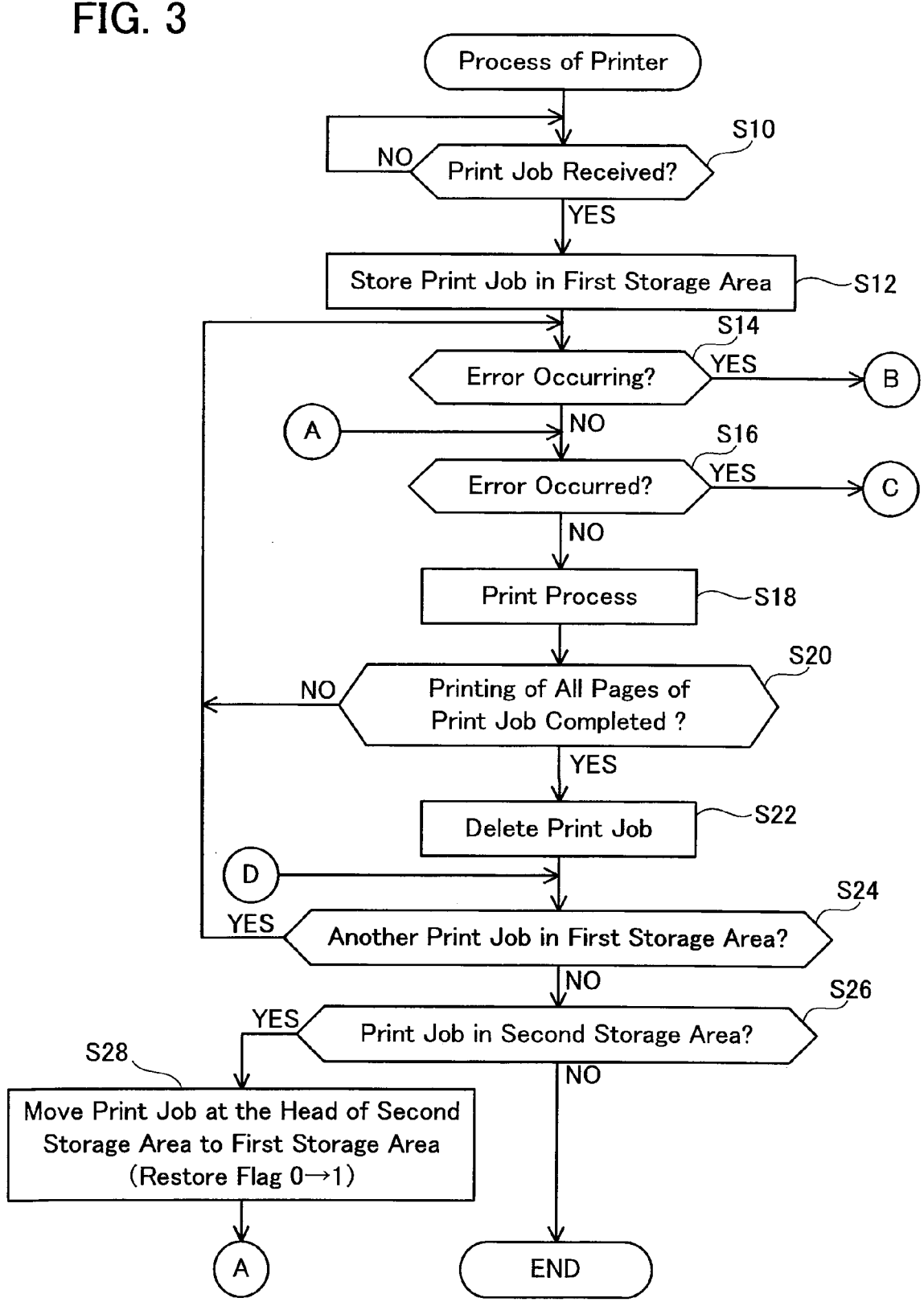
FIG. 3 shows a flow chart of a process executed by the printer.
Figure 4:
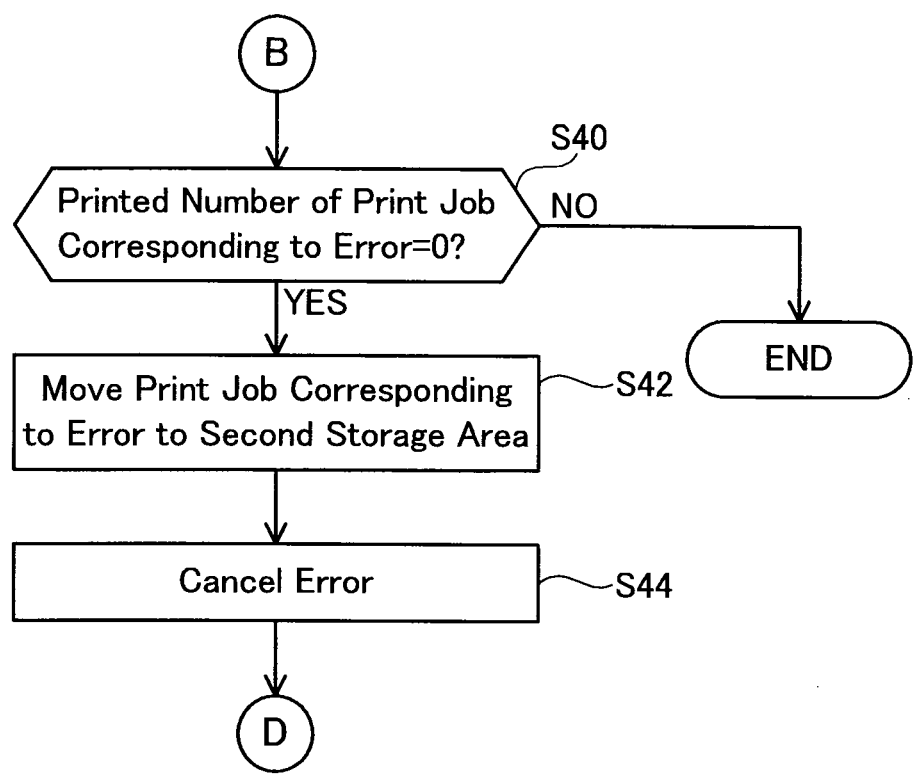
FIG. 4 shows a continuation of the flow chart of the process of FIG. 3.
Figure 5:
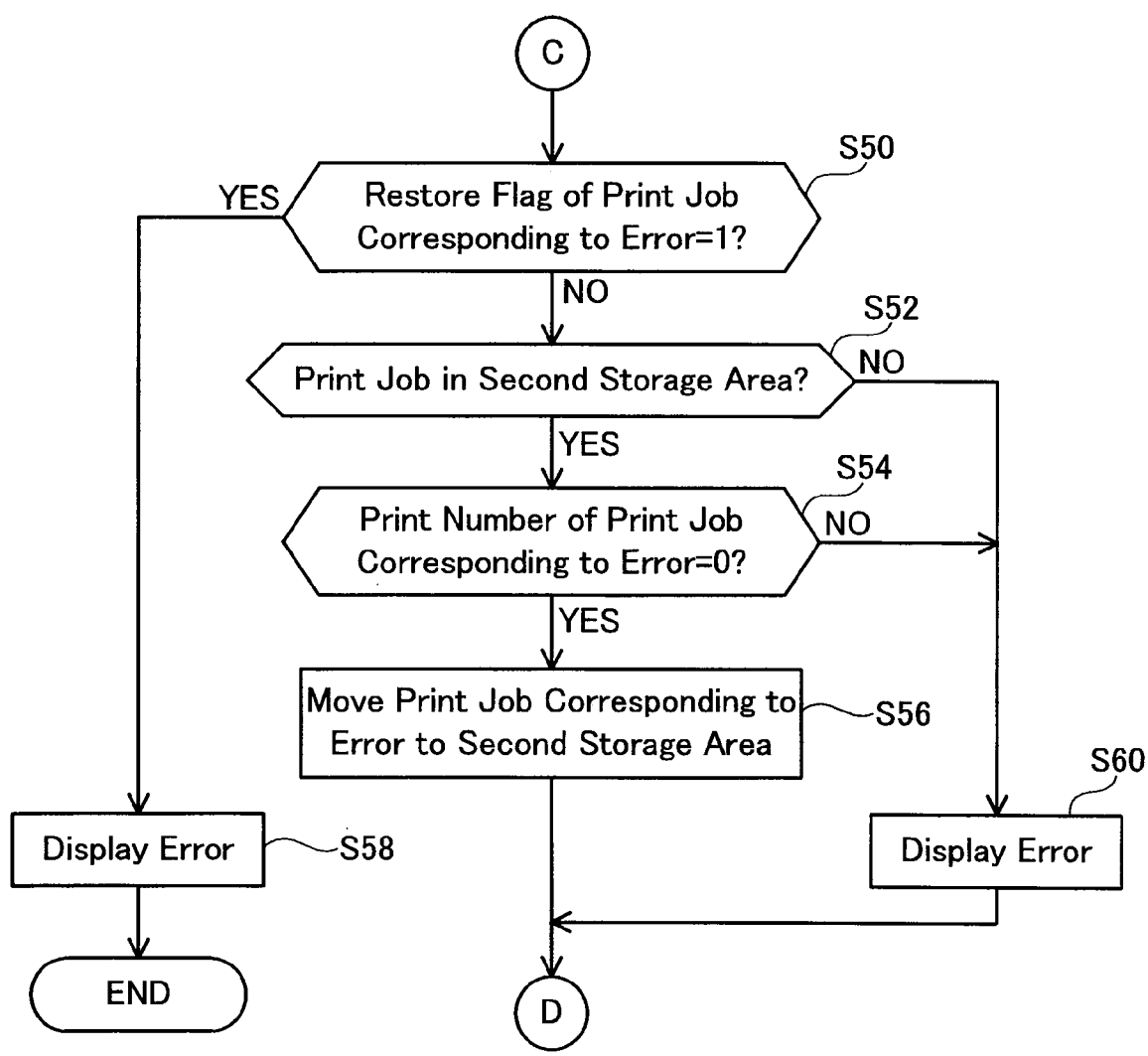
FIG. 5 shows a continuation of the flow chart of the process of FIG. 3.

Next, the contents of a process executed by the CPU 32 will be described. FIG. 3 shows a flow chart of the process executed by the CPU 32. The CPU 32 monitors whether a print job has been received (S10). In the case where S10 is YES, the CPU 32 stores the print job received in S10 in the first storage area 38 (S12). Moreover, when another print job is received while the process from S14 onwards is being executed, the CPU 32 is capable of executing the process from S14 onwards and the process of S12 in parallel. Next, the CPU 32 determines whether an error is occurring (S14). That is, the CPU 32 determines whether an error is occurring not in the print job received in S10 but in a print job prior to this. When an error is occurring, the error is displayed on the display device 24 (see S58 or S60 of FIG. 5). In the case where S14 is YES, the process proceeds to S40 of FIG. 4.

In the case where S14 is NO, the CPU 32 determines whether an error has occurred in a print job that is to be printed (the print job received in S10 or a print job that has been received prior to the print job received in S10 and has been cached) (S16). Specifically, the CPU 32 determines the following two events.

(1) The CPU 32 determines whether the paper size of the paper size information (see reference number 72, etc. of FIG. 2) included in the print job is stored in the tray-paper size storage area 44. For example, an association of the first feed tray 10 and A4 size, and an association of the second feed tray 12 and A3 size are stored in the tray-paper size storage area 44. In the case where the paper size of the paper size information included in the print job is B5, the CPU 32 determines YES in S16. In the case where S16 is YES, the process proceeds to S50 of FIG. 5. In this case, YES is determined in S16 in the state where not even one page has been printed.

(2) The CPU 32 retrieves the tray-paper size storage area 44 from the paper size of the paper size information included in the print job to be printed, and specifies the feed tray that is housing printing paper of that size. For example, in the case where the paper size of the paper size information included in the print job to be printed is A4, the first feed tray 10 is specified. In this case, the CPU 32 monitors the detected results of the first paper sensor 20. If the first paper sensor 20 detects that the printing paper is not being housed in the first paper tray 10, the CPU 32 determines YES in S16. Further, in the case for example where the paper size of the paper size information included in the print job to be printed is A3, the second feed tray 12 is specified. In this case, the CPU 32 monitors the detected results of the second paper sensor 22. If the second paper sensor 22 detects that the printing paper is not being housed in the second feed tray 12, the CPU 32 determines YES in S16. YES may be determined in S16 in the state where not even one page has been printed. Further, YES may be determined in S16 in the state where printing based on a part of the print job has been completed.

In the case where an error is not occurring in the print job (the case where S16 is NO), the CPU 32 executes the print process (S18). The CPU 32 drives the transporting device 14. The transporting device 14 thus transports one sheet of printing paper from the feed tray (for example, the first feed tray 10) that is housing printing paper of the paper size specified in S16 (the paper size of the paper size information included in the print job to be printed) to the catch tray 16. Further, the CPU 32 drives the print head 18. The print head 18 thus prints an image corresponding to print data (see, for example, reference number 74 of FIG. 2) of the print job to be printed onto the printing paper that is being transported by the transporting device 14. An image is printed onto one page of printing paper in S18. The CPU 32 counts up the printed number data (see, for example, reference number 76 of FIG. 2) corresponding to the print job to be printed. For example, in the case of the printed number data 76 of FIG. 2, the number is changed to "6/10".

The CPU 32 determines whether printing has been completed of all the pages in the print job (S20). This determination can be made based on the printed number data corresponding to the print job. For example, in the case where the printed number data is "6/10", NO is determined in S20. In this case, the image of the seventh page of printing paper is printed by performing S14, S16, and S18. In the case for example where the printed number data is "10/10", YES is determined in S20. In this case, the CPU 32 deletes the print job from the first storage area 38 (S22).

Next, the CPU 32 determines whether another print job (for example, the print job 80 of FIG. 2) is present in the first storage area 38 (S24). In the case where S24 is YES, the print process of the other print job is executed by performing S14, S16, and S18. In the case where S24 is NO, the CPU 32 determines whether a print job (for example, the print job 90 of FIG. 2) is present in the second storage area 40 (S26). In the case where S26 is YES, the CPU 32 moves the print job 90 of the second storage area 40 to the first storage area 38 (S28). In this case, the CPU 32 changes the restore flag 98 from "0" to "1". In the case where S26 is NO, the CPU 32 ends the process and monitors whether a print job has been received (S10).

Next, the process will be described for the case where YES was determined in S14 of FIG. 3. In the case where S14 is YES, the process proceeds to S40 of FIG. 4. In S40, the CPU 32 determines whether the printed number of a print job in which an error is occurring is "0". For example, the printed number of the print job 70 of FIG. 2 is "5/10". In the case where an error is occurring in the print job 70, NO is determined in S40. In this case, the CPU 32 ends the process. The CPU 32 does not resolve the error state even if there is another print job present in the first storage area 38 (or if another print job is received). A print process for the other print job is thus prohibited from being executed.

The printed number of the print job 80 of FIG. 2 is "0". In the case where an error is occurring in the print job 80, YES is determined in S40. In this case, the CPU 32 deletes the print job in which the error is occurring from the first storage area 38, and moves this print job to the second storage area 40 (S42). Moreover, the printed number data and the restore flag are also moved to the second storage area 40. Next, the CPU 32 cancels the error (S44). That is, the state where error is being shown on the display device 24 is cancelled. In this case, the CPU 32 proceeds to S24 of FIG. 3, and determines whether another print job is present in the first storage area 38. In the case of YES in S24, the process proceeds to S14. Since the error was cancelled in S44, NO is determined in S14. Further, when NO is determined in S16, the print process for the other print job is executed (S18). As is clear from the above description, the print process for the other print job is allowed to be executed in the case where the printed number of the print job in which an error is occurring is "0".

Next, the process will be described for the case in which YES is determined in S16 of FIG. 3. In the case of YES in S16, the process proceeds to S50 of FIG. 5. In S50, the CPU 32 determines whether the restore flag of the print job in which an error is occurring is "1". That is, the CPU 32 determines whether the print job in which an error is occurring has undergone the process of S28 of FIG. 3. In the case where S50 is YES, the CPU 32 causes the display device 24 to display error (S58). When S58 ends, the (CPU 32 ends the process. That is, the error state is maintained.

In the case where S50 is NO, the CPU 32 determines whether a print job is present in the second storage area 40 (S52). In the case for example where the print job 90 of FIG. 2 is present, YES is determined in S52. In this case, the CPU 32 determines whether the printed number of the print job in which an error is occurring is "0" (S54). This process is the same as S40 of FIG. 4. In the case where S54 is YES, the CPU 32 deletes the print job in which the error is occurring from the first storage area 38, and moves this print job to the second storage area 40 (556). This process is the same as S42 of FIG. 4. When S56 ends, the process proceeds to S24. In this case, the print process of the other print job is allowed to be executed. In the case where S52 is NO or S54 is NO, the CPU 32 causes the display device 24 to display error (S60). When S60 ends, the CPU 32 proceeds to S24.

In the aforementioned embodiment, YES is determined in S16 of FIG. 3 in the case where the printing paper of the size specified in the print job is not being housed in the first feed tray 10 or the second feed tray 12. In this case, the print process of this print job is not started, and consequently YES is determined in S54 of FIG. 5. Tis print job is moved to the second storage area 40 (S56). In this case, the print process of the other print job is allowed to be executed. Since the print process of the other print job is allowed to be executed in the aforementioned condition, the printer 2 can efficiently execute the print processes of a plurality of print jobs.

Further, YES is also determined in S16 in the case where the printing paper runs out while the print process of a print job is being executed. In this case, the print process of this print job has started, and consequently NO is determined in S54 of FIG. 5 and the error state occurs (S60). In this case, the print process of the other print job is prohibited from being executed. Since the print process of the other print job is prohibited from being executed in the aforementioned condition, the printer 2 can prevent the printing paper obtained from print processes of a plurality of print jobs from being mixed together in the catch tray 16.

The printer 2 of the present embodiment can efficiently execute the print processes of a plurality of print jobs while preventing the printing paper obtained in the print processes of the plurality of print jobs from being mixed together in the catch tray 16.

(Second Embodiment)

Figure 6:
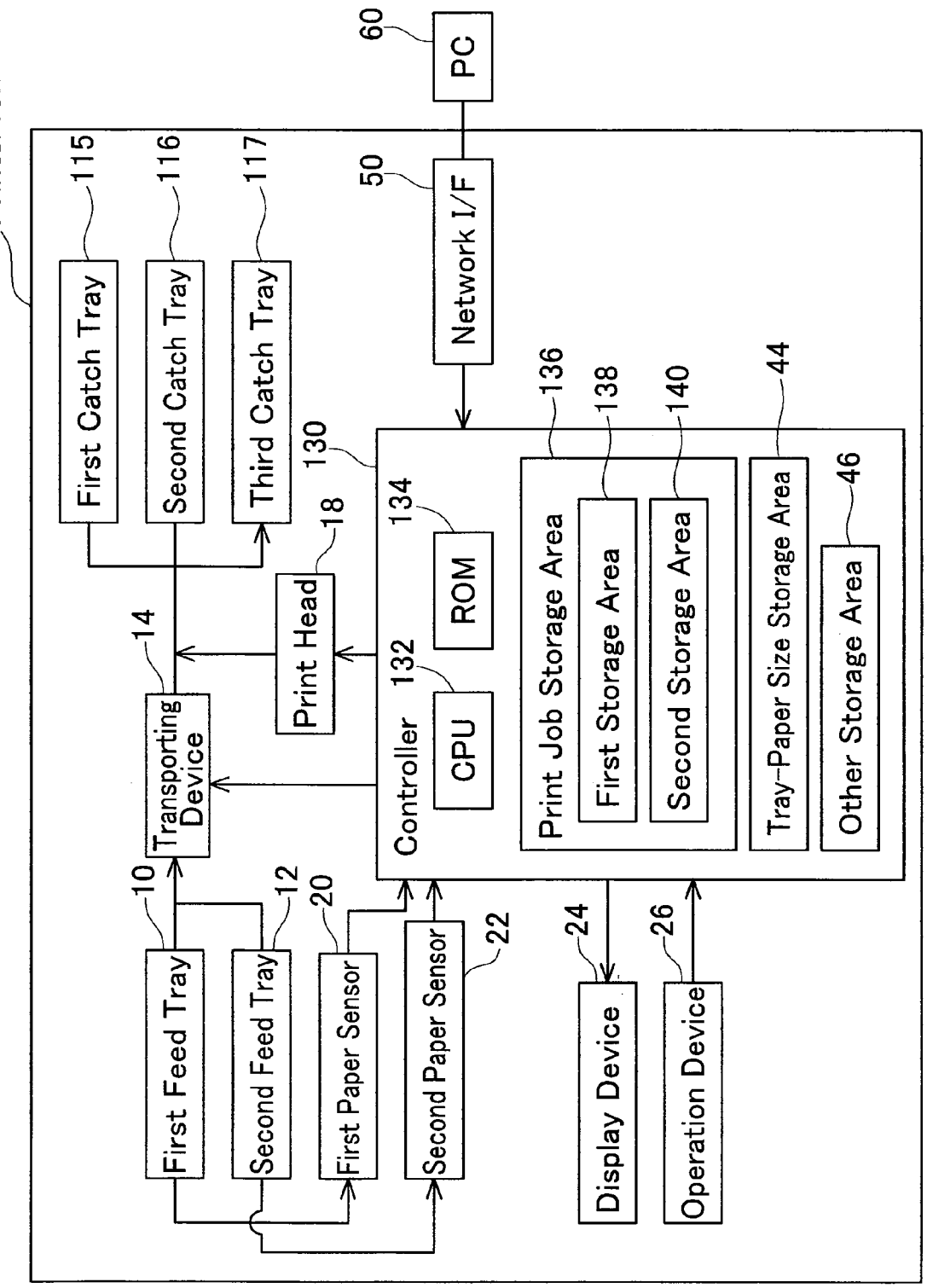
FIG. 6 shows the configuration of a printer of a second embodiment.

A printer of a second embodiment will now be described. FIG. 6 shows a printer 102 of the present embodiment. Structural elements of the printer 102 that are the same as those of the first embodiment have the same numbers appended thereto. Below, structural elements differing from the fist embodiment will be described. The printer 102 comprises a plurality of catch trays 115, 116, and 117. The program stored in a ROM 134 of a controller 130 differs from that of the first embodiment. As a result, the contents of the process executed by a CPU 132 also differ from those of the first embodiment. This point will be described in detail later.

Figure 7:
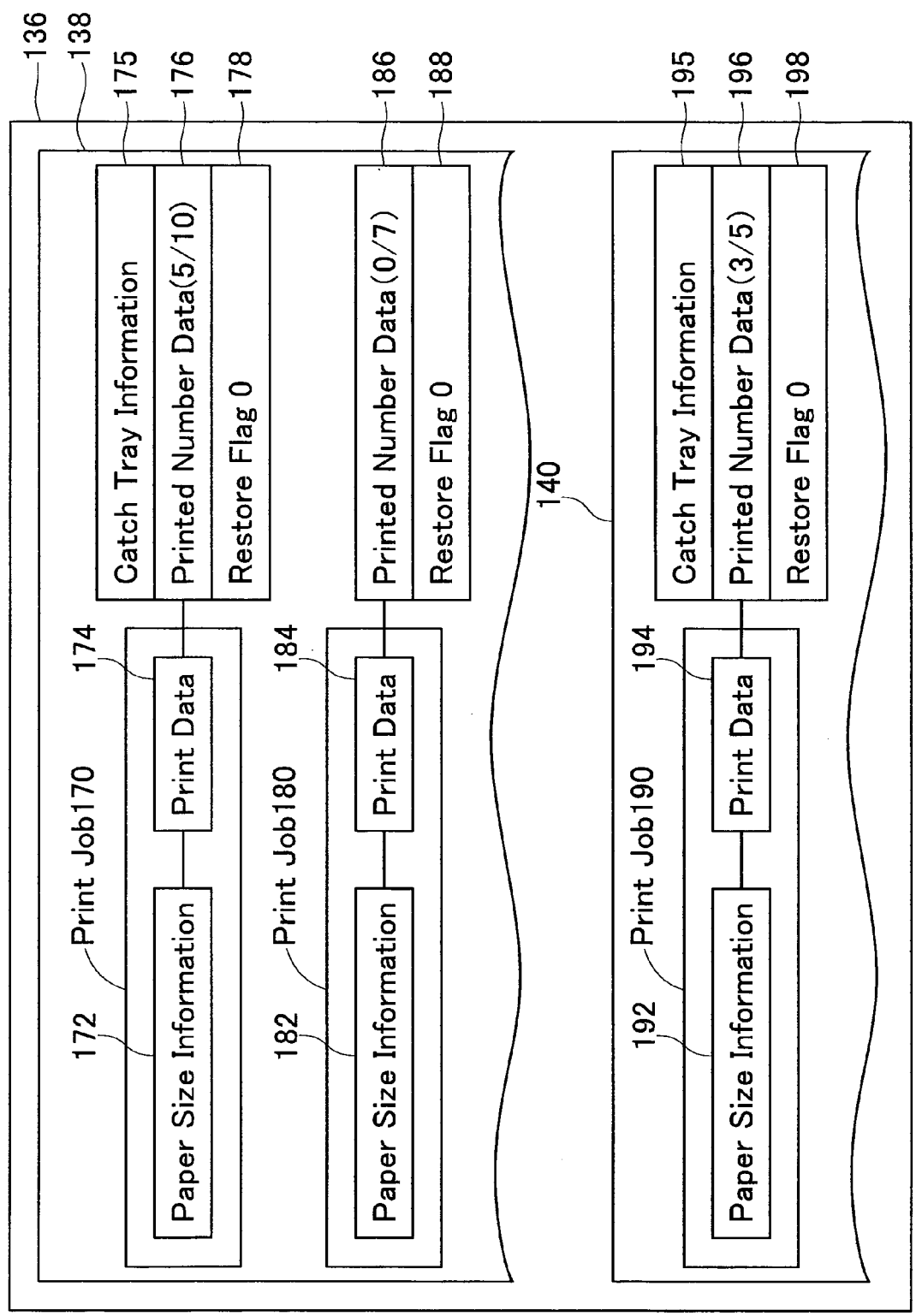
FIG. 7 shows a figure for explaining a print job storage area.

A print job storage area 136 has a first storage area 138 and a second storage area 140. FIG. 7 shows an example of stored contents of the print job storage area 136. The first storage area 138 is capable of storing a plurality of print jobs 170 and 180. The print job 170 includes paper size information 172 and print data 174. Catch tray information 175, printed number data 176, and a restore flag 178 are associated with the print job 170. The catch tray information 175 is information specifying which catch tray (any of the catch trays 115 to 117 of FIG. 6) is the destination for printing paper obtained from a print process of the print job 170. The print job 180 also includes paper size information 182 and print data 184. Printed number data 186 and a restore flag 188 are associated with the print job 180. Since printing is not started in the print job 180, catch tray information (see reference number 175) is not associated in the print job 180.

The second storage area 140 is capable of storing a plurality of print jobs 190 (only one print job 190 is shown in the example in FIG. 7). The print job 190 includes paper size information 192 and print data 194. Catch tray information 195, printed number data 196 and a restore flag 198 are associated with the print job 190. In the first embodiment, the printed number data 96 stored in the second storage area 40 (see FIG. 2) is "0". By contrast, in the present embodiment, the printed number data 196 of the print job 190 stored in the second storage area 140 need not necessarily be "0" (in the example in FIG. 7, it is "3/5").

(Process Executed by the CPU)

Figure 8:
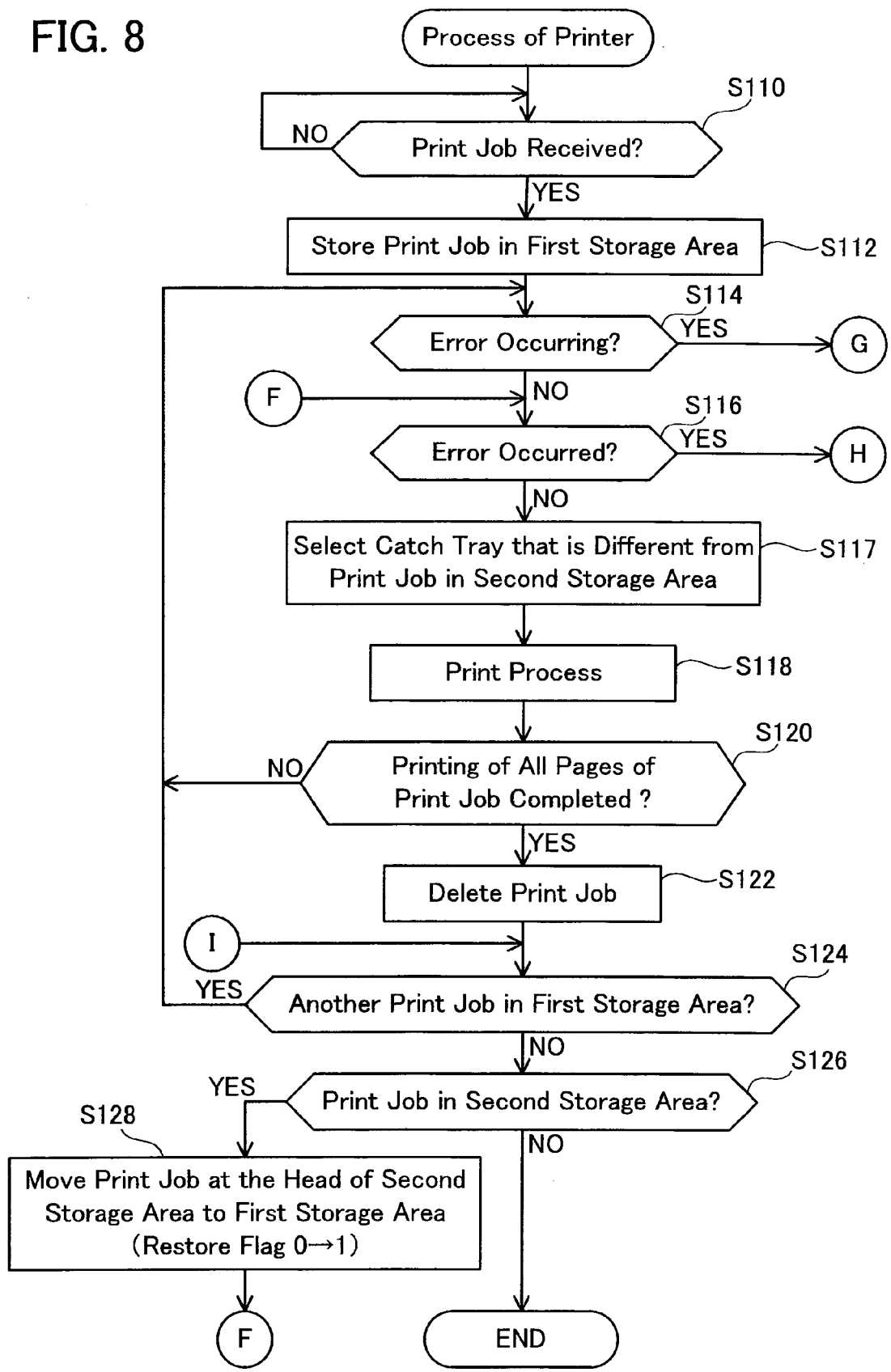
FIG. 8 shows a flow chart of a process executed by the printer.

Next, the contents of the process executed by the CPU 132 will be described. FIG. 8 shows a flow chart of the process executed by the CPU 132. The process of S110 to S116 is the same as the process of S10 to S16 of FIG. 3. In the case where S116 is NO, the CPU 132 selects a catch tray that is different from that of the print job that is being stored in the second storage area 140 (S117). For example, in the case where the catch tray information 195 of the print job 190 of FIG. 7 is the first catch tray 115, the CPU 132 selects the second catch tray 116 or the third catch tray 117. Moreover, for the print job to be printed (for example, the print job 170 of FIG. 7), the CPU 132 associates information (for example, the catch tray information 175) relating to the catch tray selected in S117. The process of S118 to S128 is the same as the process of S18 to S28 of FIG. 3.

Figure 9:
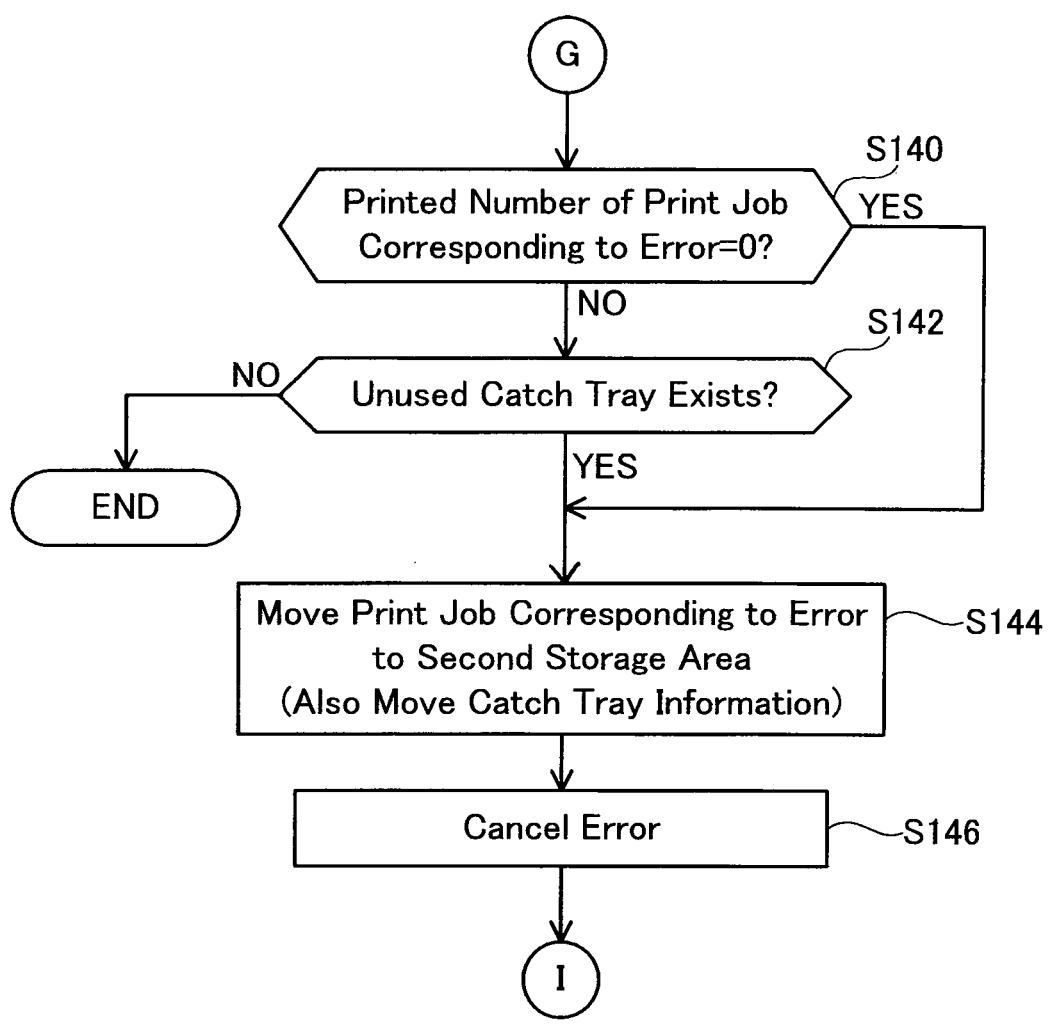
FIG. 9 shows a continuation of the flow chart of the process of FIG. 8.

Next, a process will be described for the case where YES was determined in S114 of FIG. 8. In the case where S114 is YES, the process proceeds to S140 of FIG. 9. In S140, the CPU 132 determines whether the printed number of a print job in which an error is occurring is "0". In the case where S140 is NO, the process proceeds to S142. In the case where S140 is YES, S142 is skipped, and the process proceeds to S144. In S142, the CPU 132 determines whether there is a catch tray that is not being used in the print job in which the error is occurring or in the print job of second storage area 140. For example, an error is occurring in the print job 170 of FIG. 7, and the catch tray information 175 of that print job 170 is the first catch tray 115. Further, in this case, the catch tray information 195 of the print job 190 is the second catch tray 116. In this case, the third catch tray 117 is not being utilized, and consequently the CPU 132 determines YES in S142. In the case where S142 is NO, the CPU 132 ends the process. In the case where S140 is YES, or in the case where S142 is YES, the CPU 132 moves the print job in which the error is occurring to the second storage area 140 (S144). Moreover, the catch tray information, the printed number data and the restore flag are also moved to the second storage area 140. Next, the CPU 132 cancels the error (S146). As is clear from the above description, the print process for another print job is allowed to be executed in the case where the printed number of the print job in which an error is occurring is "0" or in the case where an unused catch tray exists.

Next, the process will be described for the case where YES is determined in S116 of FIG. 8. In the case of YES in S116, the process proceeds to S150 of FIG. 10. The process of S150 to S154 is the same as the process of S50 to S54 of FIG. 5. In the case of NO in S152, the CPU 132 causes error to be shown on the display device 24 (S162). When S162 ends, the CPU 132 proceeds to S124 of FIG. 8. Further, in the case of NO in S154, the CPU 132 determines whether a catch tray exists that is not being used for the print job in which an error is occurring or for the print job of the second storage area 140 (S156). This process is the same as S142 of FIG. 9. In the case of NO in S156, the CPU 132 causes error to be shown on the display device 24 (S160). When S160 ends, the CPU 132 ends the process. That is, the error state is maintained.

In the case of YES in S156, the CPU 132 moves the print job in which the error is occurring to the second storage area 140 (S158). This process is the same as the process of S144 of FIG. 9. When S158 ends, the process proceeds to S124. In this case, the print process of the other print job is allowed to be executed.

In the aforementioned embodiment the print process of another print job is allowed to be executed in the case where the printing paper of the size specified in the print job is not being housed in the first feed tray 10 or the second feed tray 12. Since the print process of another print job is allowed to be executed under the aforementioned condition, the printer 102 can efficiently execute the print processes of a plurality of print jobs.

Figure 10:
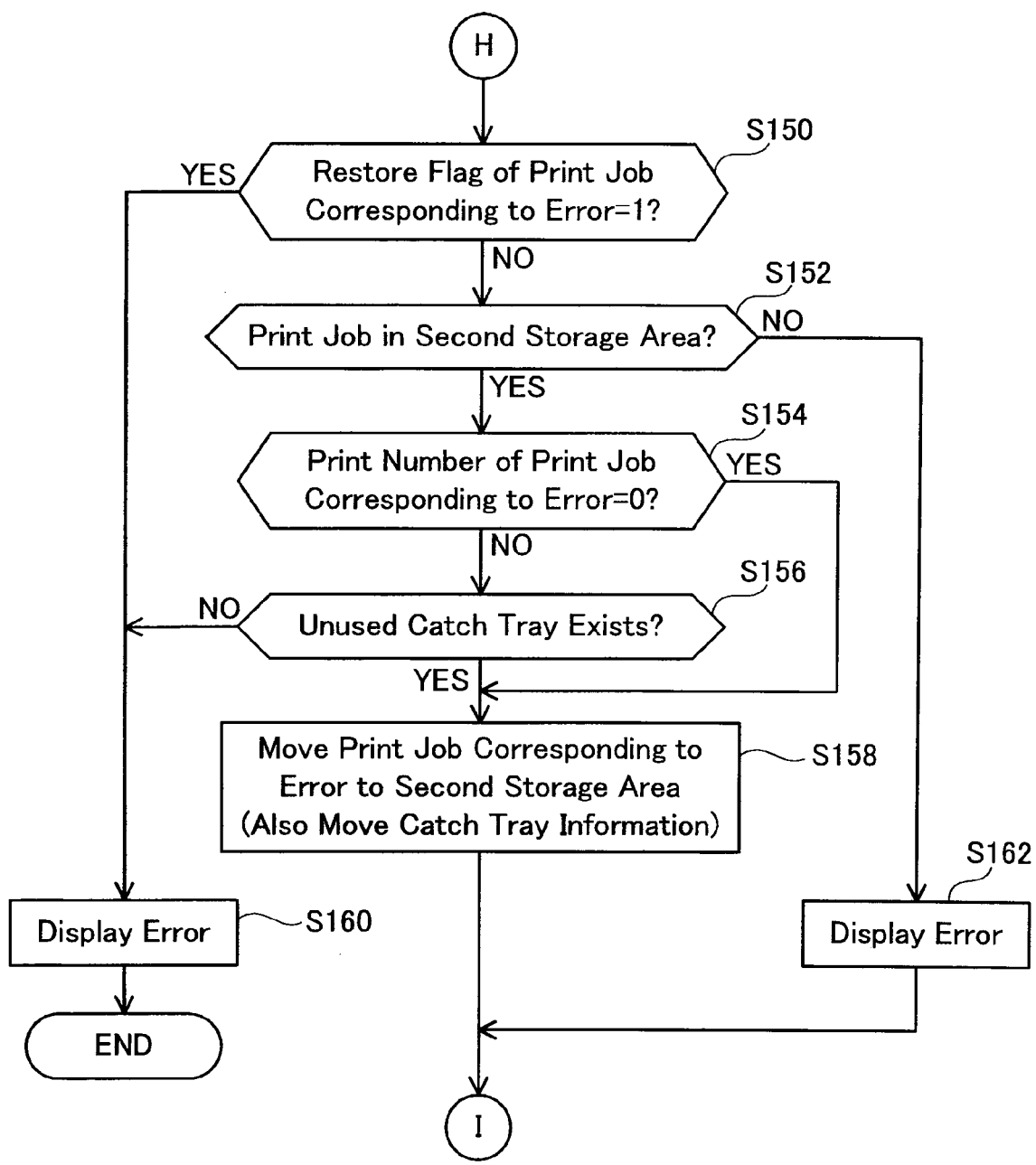
FIG. 10 shows a continuation of the flow chart of the process of FIG. 8.

Further, in the case where the printing paper runs out when the print process based on a part of a print job has been completed, it is determined whether an unused catch tray exists (S156 of FIG. 10). An error state occurs in the case where there is not an unused catch tray (S160). In this case, the print process of another print job is prohibited from being executed. Since the print process of the other print job is prohibited from being executed under the aforementioned condition, the printer 102 can prevent the printing paper obtained from the print processes of a plurality of print jobs from being mixed together in the catch tray. In the case where an unused catch tray exists, that catch tray is selected (S117 of FIG. 8), and the print process of another print job is allowed to be executed. Since the print process of another print job is allowed to be executed under the aforementioned condition, the printer 102 can efficiently execute the print processes of a plurality of print jobs.

The printer 102 of the present embodiment is capable of efficiently executing the print processes of a plurality of print jobs while preventing the printing paper obtained in the print processes of the plurality of print jobs from being mixed together in the catch tray.

Variants of the above embodiments are given below. For example, the printers 2 and 120 of the above embodiments print a print job received from the PC 60. However, the printers 2 and 120 may equally well be facsimile devices that receive and print facsimile data (print jobs) received from the exterior. Further, the printers 2 and 120 may equally well have a copy function.

A portion of the technique of the above embodiments and the variants thereof is given below. A printer is disclosed in Japanese Patent Application Publication No. 11-249828 that, in the case where it is possible to execute the print process of a print job that is received while an error is occurring, executes the print process of that print job. Even if an error occurs during the print process of a print job, it is possible with this technique to execute the print process of another print job without waiting for the error to be resolved. There may be only one location to which a print medium that has been printed is ejected. In this case, when the conventional technique is adopted and the second error has occurred, the following event may occur. An error occurs during the print process of a first print job, then the print process of a second print job is executed, and after the error has been resolved the remainder of the print process of the first print job is executed. In this case, the print medium obtained in the print process based on a part of the first print job, the print medium obtained in the print process based on the second print job, and the print medium obtained in the print process based on the remainder of the first print job are mixed together.

In a first condition where a first print job is received by the receiving device, the detecting device detects that the housing portion is not housing the type of print medium specified by the type information included in the first print job, the determination device determines that the print process based on the first print job has not been started, and a second print job is received by the receiving device after the first print job was received, the controller may allow the print device to execute the print process based on the second print job before the print process based on the first print job has not been completed.

In the case of, for example, the first error (the case where the size of the print medium specified by the print job does not conform with the size of the print medium housed in the print device), the detecting device detects that the housing portion is not housing the type of print medium specified by the type information included in the print job. Further, the determination device determines that the print process based on that print job has not been started. In this case, since the print process based on that print job has not been started, the print media will not be mixed together even if the print process based on the other print job is executed. Therefore, the controller allows the print device to execute the print process based on the other print job. Since, in the first condition, the printer is allowed to execute the print process based on the other print job, it is possible to execute the print process of the other print job without waiting for the error to be resolved. It is consequently possible to efficiently execute print processes based on a plurality of print jobs.

In a second condition where, a third print job is received by the receiving device, the detecting device detects that the housing portion is not housing the type of print medium specified by the type information included in the third print job, and the determination device determines that the print process based on the third print job has been started the controller may prohibit the print device from executing the print process based on the other print job. This "prohibit" may mean any of the followings: (1) the controller suspends the print process based on the other print job and allows to execute the print process based on the other print job after the print process based on the third print job has been completed; (2) the controller cancels (deletes) the other print job (in this case, the other print job will not be executed even if the print process based on the third print job has been completed); and (3) the controller prohibits the receiving device from receiving the other print job.

In the case of, for example, the second error (the case where the print medium housed in the print device runs out while the print process of the print job is being executed), the detecting device detects that the housing portion is not housing the type of print medium specified by the type information included in the print job. In this case, the determination device determines that the print process has been started. Since the print process based on that print job has ben started, there is the possibility that the print media would be mixed together if the print process based on the other print job were executed. Therefore, the controller prohibits the print device from executing the print process based on the other print job. Since, in the second condition, the printer is prohibited from executing the print process based on the other print job, it is possible to prevent the print media obtained from print processes based on a plurality of print jobs from being mixed together.

The above printer changes the processes executed under the first condition and the second condition. Print processes based on a plurality of print jobs are executed efficiently while the print media obtained from print processes based on a plurality of print jobs are prevented from being mixed together. Moreover, the first condition may include not only the case where the printer is housing only print media that is of a type differing from that specified by the print job (for example, of a different size), and but also the case where the printer is not housing the print medium. Further, the type of print medium detected by the detecting device may include not only the size of the print medium, but also for example, whether the print medium is glossy paper, normal paper, etc.

A printer may comprises a plurality of support portions, each support portion configured to support the print medium that has been printed, and a transporting device that transports the print medium that has been printed to any one of the support portions. In a third condition where, a fourth print job is received by the receiving device, the detecting device detects that the housing portion is not housing the type of print medium specified by the type information included in the fourth print job, and the determination device determines that the print process based on the fourth print job has been started, the controller may specify a support portion that is different from a support portion supporting the print medium that has been printed in the print process based on the fourth print job, allow the print device to execute the print process based on the other print job, and allow the transporting device to transport a print medium that has been printed in the print process based on the other print job to the specified support portion.

The above printer is capable of executing the print process based on the other print job even in the case where the third condition occurs in the print job. The print medium obtained in the print process based on the later print job is transported to a support portion differing from the support portion to which the print medium obtained in the print process based on the former print job is transported. As a result, it is possible to prevent the print media obtained in print processes based on a plurality of print jobs from being mixed together.

In a case where the detecting device detects that the housing portion is not housing the type of print medium specified by the type information included in the print job, the determination device determines that the print process based on the print job has not been started and another print job is being stored in the print job storage device, the controller may control the print device to execute the print process based on the other print job. In a case where the detecting device detects that the housing portion is not housing the type of print medium specified by the type information included in the print job, the determination device determines that the print process based on that print job has been started, and another print job is being stored in the print job storage device, the controller may control the print device to not execute the print process based on the other print job.

What is claimed is:

1. A printer comprising:
   a receiving device configured to receive a print job including print data and type information specifying a type of print medium;
   a housing portion configured to house a print medium that has not been printed;
   a print device configured to execute a print process that prints an image corresponding to the print data included in the received print job on the type of print medium specified by the type information included in the print job;
   a detecting device configured to detect whether the housing portion is housing the type of print medium specified by the type information included in the received print job; and
   a controller configured to control the print device based on information detected by the detecting device and information relating to whether the print process has been started,
   wherein, when a first print job is received and a second print job is received after the first print job, and the detecting device detects that the housing portion is not housing a type of print medium specified by type information included in the first print job, the controller is configured to:
   determine whether a print process based on the first print job has been started;
   when the print process based on the first print job has not been started, allow the print device to execute a print process based on the second print job before completion of the print process based on the first print job; and
   when the print process based on the first print job has been started, prohibit the print device from executing the print process based on the second print job before the completion of the print process based on the first print job.

2. The printer as in claim 1, further comprising:
   a print job storage device configured to store the print job received by the receiving device,
   wherein the print job storage device comprises a first storage area and a second storage area,
   wherein the first storage area is configured to store a plurality of print jobs including the first print job and the second print job,
   wherein the controller is further configured to control the print device to execute, in sequence, print processes corresponding to the plurality of print jobs stored in the first storage area, and
   wherein, when the print process based on the first print job has not been started and the detecting device detects that the housing portion is not housing the type of print medium specified by the type information included in the first print job, the controller is configured to move the first print job to the second storage area and to control the print device to execute the print process based on the second print job stored in the first storage area.

3. The printer as in claim 2, further comprising:
a deletion device configured to, when one of the print processes based on a corresponding one of the print jobs has been completed, delete the corresponding one of the print jobs from the first storage area,
wherein the controller is further configured to move one or more print jobs stored in the second storage area to the first storage area when no print job is stored in the first storage area.

4. The printer as in claim 1, further comprising:
a type storage device; and
a plurality of housing portions,
wherein the type storage device is configured to store, for each of the housing portions, an association of the housing portion and type information specifying a type of print medium to be housed in the housing portion, and
wherein the detecting device is configured to detect whether one or more of the housing portions corresponding to the type information included in the received print job is housing a print medium.

5. A printer comprising:
a receiving device configured to receive a print job including print data and type information specifying a type of print medium;
a housing portion configured to house a print medium that has not been printed;
a print device configured to execute a print process that prints an image corresponding to the print data included in the received print job on the type of print medium specified by the type information included in the print job;
a detecting device configured to detect whether the housing portion is housing the type of print medium specified by the type information included in the received print job; and
a controller configured to control the print device based on information detected by the detecting device and information relating to whether the print process has been started,
wherein, when a first print job is received and a second print job is received after the first print job, and the detecting device detects that the housing portion is not housing a type of print medium specified by type information included in the first print job, the controller is configured to:
determine whether a print process based on the first print job has been started;
when the print process based on the first print job has not been started, allow the print device to execute a print process based on the second print job before completion of the print process based on the first print job;
when the print process based on the first print job has been started:
specify a first support portion different from a second support portion, the second support portion being specified to support a print medium that has been printed in the print process based on the first print job;
allow the print device to execute the print process based on the second print job before the completion of the print process based on the first print job; and
allow the transporting device to transport a print medium that has been printed in the print process based on the second print job to the specified first support portion.

6. The printer according to claim 5, further comprising a print job storage device configured to store the received print job,
wherein the print job storage device comprises a first storage area and a second storage area,
wherein the first storage area is configured to store a plurality of print jobs including the first print job and the second print job,
wherein the controller is configured to control the print device to execute, in sequence, print processes corresponding to the plurality of print jobs stored in the first storage area, and
when the print process based on the first print job has been started and the detecting device detects that the housing portion is not housing the type of print medium specified by the type information included in the first print job, the controller is configured to move the first print job to the second storage area, and to store an association between the first print job and support portion information for identifying the second support portion.

7. A non-transitory computer readable medium storing computer readable instructions that, when executed, cause a printer to:
receive a first print job including print data and type information specifying a type of print medium;
detect whether a housing portion of the printer is housing the type of print medium specified by the type information included in the received first print job;
determine whether a second print job has been received after receipt of the first print job;
when the second print job is determined to have been received after the first print job, and the housing portion is detected not to house the type of print medium specified by the type information included in the first print job:
determine whether a print process based on the first print job has been started;
when the print process based on the first print job has not been started, allow execution of a print process based on the second print job before completion of the print process based on the first print job; and
when the print process based on the first print job has been started, prohibit execution of the print process based on the second print job before the completion of the print process based on the first print job.

8. The non-transitory computer readable medium as in claim 7, wherein the computer readable instructions, when executed, further cause the printer to execute, in sequence, print processes corresponding to a plurality of print jobs, including the first print job and the second print job, stored in a first storage area of the printer, and
wherein, when the print process based on the first print job has not been started and the housing portion is detected not to house the type of print medium specified by the type information included in the first print job, the computer readable instructions are configured to cause the printer to:
move the first print job to a second storage area of the printer; and
execute the print process based on the second print job stored in the first storage area.

9. The non-transitory computer readable medium as in claim 8, wherein the computer readable instructions, when executed, further cause the printer to:
- when one of the print processes based on a corresponding one of the print jobs has been completed, delete the corresponding one of the print jobs from the first storage area; and
- move one or more print jobs stored in the second storage area to the first storage area when no print job is stored in the first storage area.

* * * * *